(12) United States Patent
Shinohara et al.

(10) Patent No.: US 7,424,453 B2
(45) Date of Patent: Sep. 9, 2008

(54) ELECTRONIC COMMERCE TRANSACTION METHOD, PROGRAM, RECORDING MEDIUM AND SERVER

(75) Inventors: Akitaka Shinohara, Kawasaki (JP); Ikuko Togase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1319 days.

(21) Appl. No.: 10/086,697

(22) Filed: Mar. 4, 2002

(65) Prior Publication Data
US 2003/0088500 A1    May 8, 2003

(30) Foreign Application Priority Data
Nov. 2, 2001 (JP) ............................... 2001-337420

(51) Int. Cl.
*G06Q 40/00* (2006.01)
(52) U.S. Cl. .............................. 705/37; 705/35; 705/28; 705/7
(58) Field of Classification Search ............. 705/35–45, 705/7–8, 3
See application file for complete search history.

(56) References Cited

U.S. PATENT DOCUMENTS

2002/0069117 A1 * 6/2002 Carothers et al. .............. 705/26

OTHER PUBLICATIONS

Barron's Dictionary of Finance and Investment Terms, 6th Edition, John Downes and Jordan Elliot Goodman, p. 483-484 "option".*

* cited by examiner

*Primary Examiner*—Mary Cheung
*Assistant Examiner*—Kirsten S Apple
(74) *Attorney, Agent, or Firm*—Staas & Halsey LLP

(57) ABSTRACT

The purchaser client of the corporation or the individual who is the contract member participates in the marketplace that is constructed in the server and requests for the commerce transaction of the commodity purchase. When the desired purchase commodity is not obtained in the marketplace, the server requests other marketplace with which the mediation contract is concluded for the commerce transaction of the commodity purchase by attaching the credit guarantee to the purchaser. With respect to the mediation with other marketplace, the credit enquiry is conducted based on the purchase history of the purchaser in his own marketplace and, when a predetermined estimation standard is satisfied, the commerce transaction of the commodity purchase is requested to other marketplace with the credit guarantee information.

13 Claims, 22 Drawing Sheets

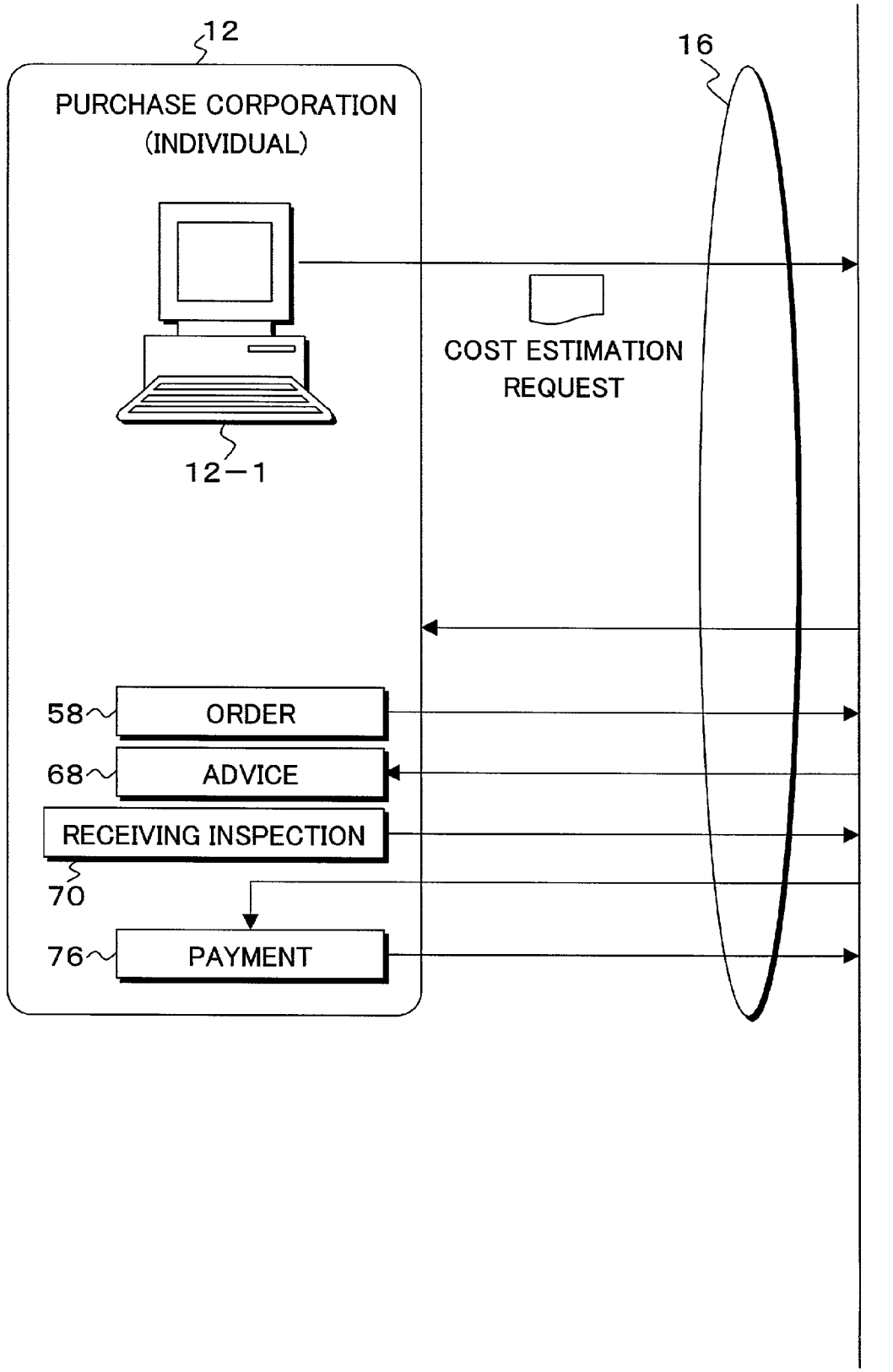

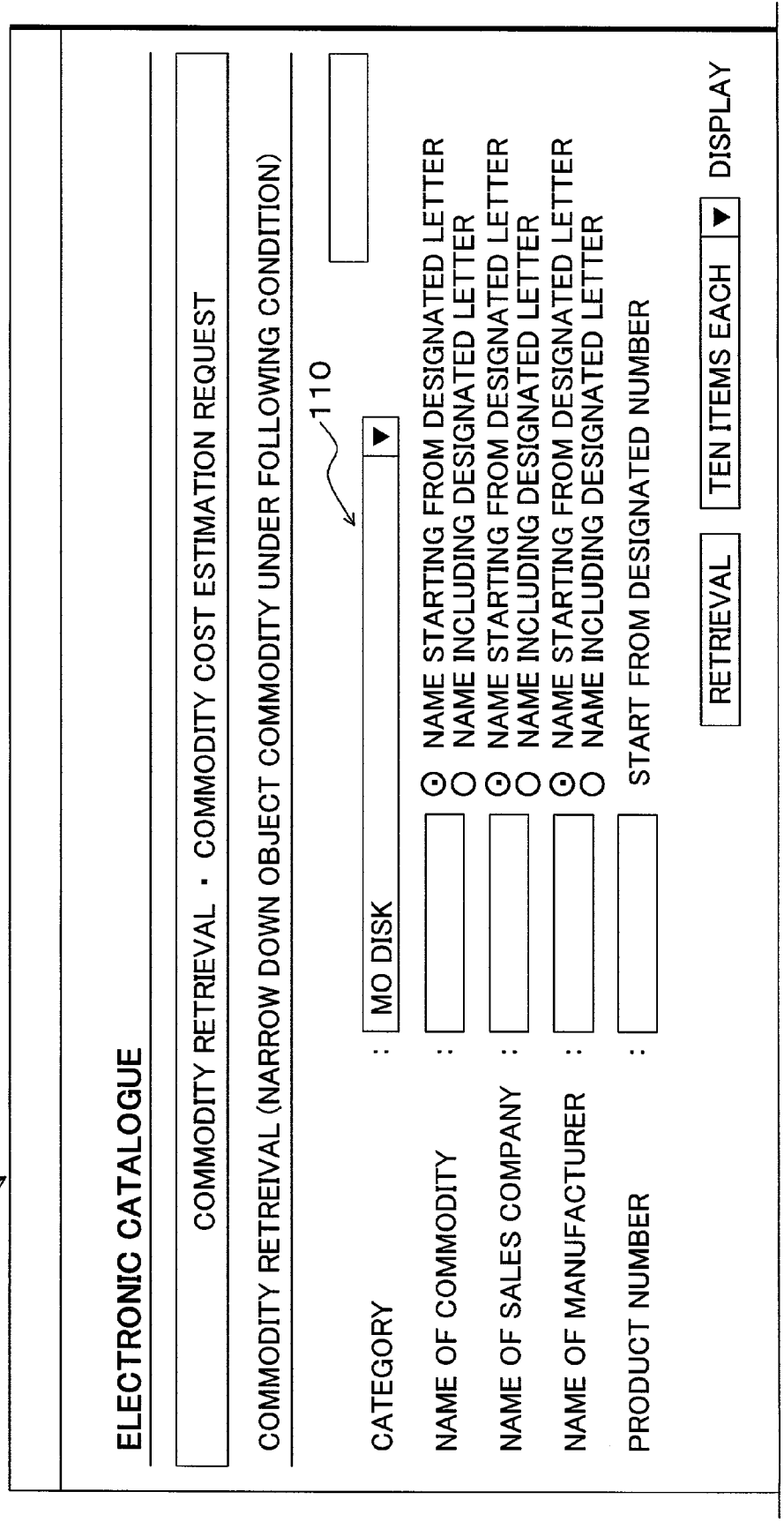

FIG. 4B

RETRIEVAL RESULT

RETRIEVAL RESULT IS 16 ITEMS UNDER DESIGNATED CONDITION
A LIST OF COMMODITIES IS DISPLAYED AS FOLLOWS

| MAGNETO-OPTICAL DISC CARTRIDGE R13G | SET THE PRICE | REQUEST FOR COST ESTIMATION |

ITEM CODE : A200100001     REGOSTERED : 2000/05/25
OA SUPPLY   |   MEDIA   |   MO DISC

| MAGNETO-OPTICAL DISC CARTRIDGE OW640 | SET THE PRICE | REQUEST FOR COST ESTIMATION |

ITEM CODE : A200100002     REGOSTERED : 2000/05/25
OA SUPPLY   |   MEDIA   |   MO DISC

COST ESTIMATION REQUEST DATA UNDER GUARANTEE 56

40 — PURCHASER BASIC INFORMATION 40-1 — CORPORATION BASIC INFORMATION
1. CORPORATE CODE
2. CORPORATE NAME
3. CORPORATE CLASSIFICATION
4. CORPORATE ADDRESS・WHERE TO CONTACT
5. STARTING DATE OF UTILIZATION
6. TERMINATING DATE OF UTILIZATION
7. DATE OF RENEWAL
8. NAME OF DEPOSIT BANK, CODE
9. DEPOSIT ACCOUNT NUMBER, ETC.
10. PAYMENT SITE CODE 40-2 — INDIVIDUAL BASIC INFORMATION
1. FULL NAME
2. OCCUPATION (COMPANY)
3. CREDIT CARD NUMBER
4. ADDRESS・WHERE TO CONTACT
5. STARTING DATE OF UTILIZATION
6. TERMINATING DATE OF UTILIZATION
7. DATE OF RENEWAL

FIG. 5B

COST ESTIMATION REQUEST DATA UNDER GUARANTEE  56

44

GUARANTEE · CREDIT INFORMATION 44-1
1. ESTIMATION RANKING
2. ESTIMATION RANKING FOR THE PAST FIVE TIMES
3. TOTAL OF RESPECTIVE ESTIMATION POINT
   · CANCELLATION OF ORDER
   · CHANGE OF ORDER
   · COMMODITY SENT BACK
   · PAYMENT DELAY 44-2
1. EXTERNAL CREDIT INFORMATION
   · CORPORATE NAME
   · CORPORATE ADDRESS
   · TELEPHONE NUMBER
   · CATEGORY OF BUSINESS
   · NUMBER OF EMPLOYEES
   · SALES
   · PROFIT
   · CUSTOMERS
   · GRADING, ETC.

FIG. 5C

COST ESTIMATION REQUEST DATA UNDER GUARANTEE 56

42

COMMODITY INFORMATION

1. EXPENSE CODE
2. BEARER AFFILIATED CODE
3. BEARER AFFILIATED NAME
4. SLIP NUMBER ※
5. APPLICANT AFFILIATED CODE
6. APPLICANT AFFILIATED NAME
7. APPLICANT EMPLOYEE NUMBER
8. APPLICANT FULL NAME ※
9. APPLICANT EXTENSION NUMBER
10. ITEM CODE ※
11. COMMODITY NAME ※
12. NAME OF MANUFACTURER ※
13. COMMODITY NUMBER ※
14. QUANTITY REQUESTED ※
15. UNIT PRICE ※
16. DELIVERY PLACE・WHERE TO MAKE CONTACT ※
17. PAYMENT SECTION ※
18. TIME OF COST ESTIMATION REPLY ※

※ INDIVIDUAL

| COMMODITY PURCHASE · COST ESTIMATION REQUEST |
|---|
| MAGNETO-OPTICAL DISCCARTORIDGE R13B |

116

```
ITEM CODE                              : A200100001
NAME OF MANUFACTURE                    : FUJITSU COWORCO LIMITED
COMMODITY NUMBER                       : 0242810
COMMODITY CATEGORY                     : OA SUPPLY  |  MEDIA  |  MO DISC
SALES UNT                              : FIVE SHEETS
MANUFACTURER'S STANDARD PRICE          : OPEN PRICE
TAX BRACKET                            : OBJECT OF TAXIATION
SALES POINT                            : REALIZATION OF HIGH DENSITY BY ADOPTION OF NEW
                                         TECHNOLOGY MRS SYSTEM.
                                         THE FIRST TIME IN THE WORLD. LARGE CAPACITY 1.3GB
                                         MO CORRESPONDING TO NEW STANDARD GIGAMO.
COMMODITY CATALOGUE                    : NONE
PURCHASE REQUEST SLIP ORIGINAL FILE    : NONE
PHYSICAL REFERENCE INFORMATION         : 3.5 TYPE HAVING SIZE ABOUT TWO TIMES THAT OF
                                         CD-ROM WITH LARGE CAPACITY OF 1.3GB.
RELATIVE REFERENCE INFORMATION         :
REGISTERED DATA OF PRODCT              : 2000/05/25
```

FIG. 6B

PURCHASE · COST ESTIMATION REQUEST

DESTINATION
METROPOLIS          : [KANAGAWA ▼]
AND DISTRICTS

PROCESS             :   ○ PURCHASE
SECTION                 ⊙ COST ESTIMATION

QUANTITY            : [ 1 ] UNIT

TIME OF             : [ 1 ] WITHIN XX DAYS
SHIPMENT

PLACE TO WHICH      : [        ]
SHIPMENT IS MADE

WHERE TO CONTACT    : [        ]

PAYMENT SECTION     : [        ]

TIME OF REPLY FOR   : [        ]
COST ESTIMATION

SLIP NUMBER : 12345
FULL NAME OF THE PURCHASER : ○○○○

CONFIRM COMMODITY AND CLICK REQUEST BUTTON

REMARK 1) SHIPMENT IS MADE IN WORKING DAY OF SUPPLY MART
REMARK 2) DESUGNATE QUANTITY IN MULTIPLES OF SALES UNIT

118

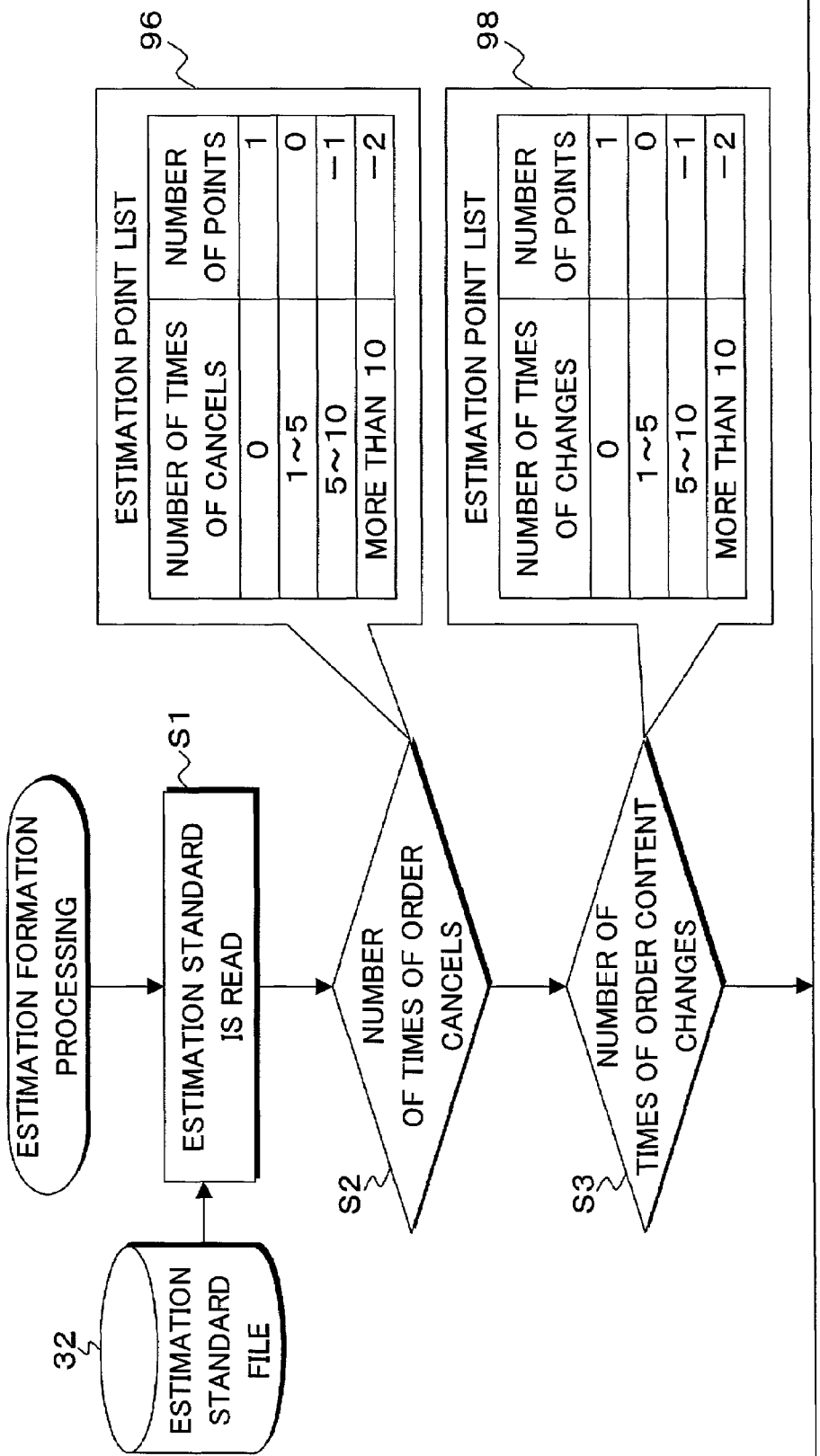

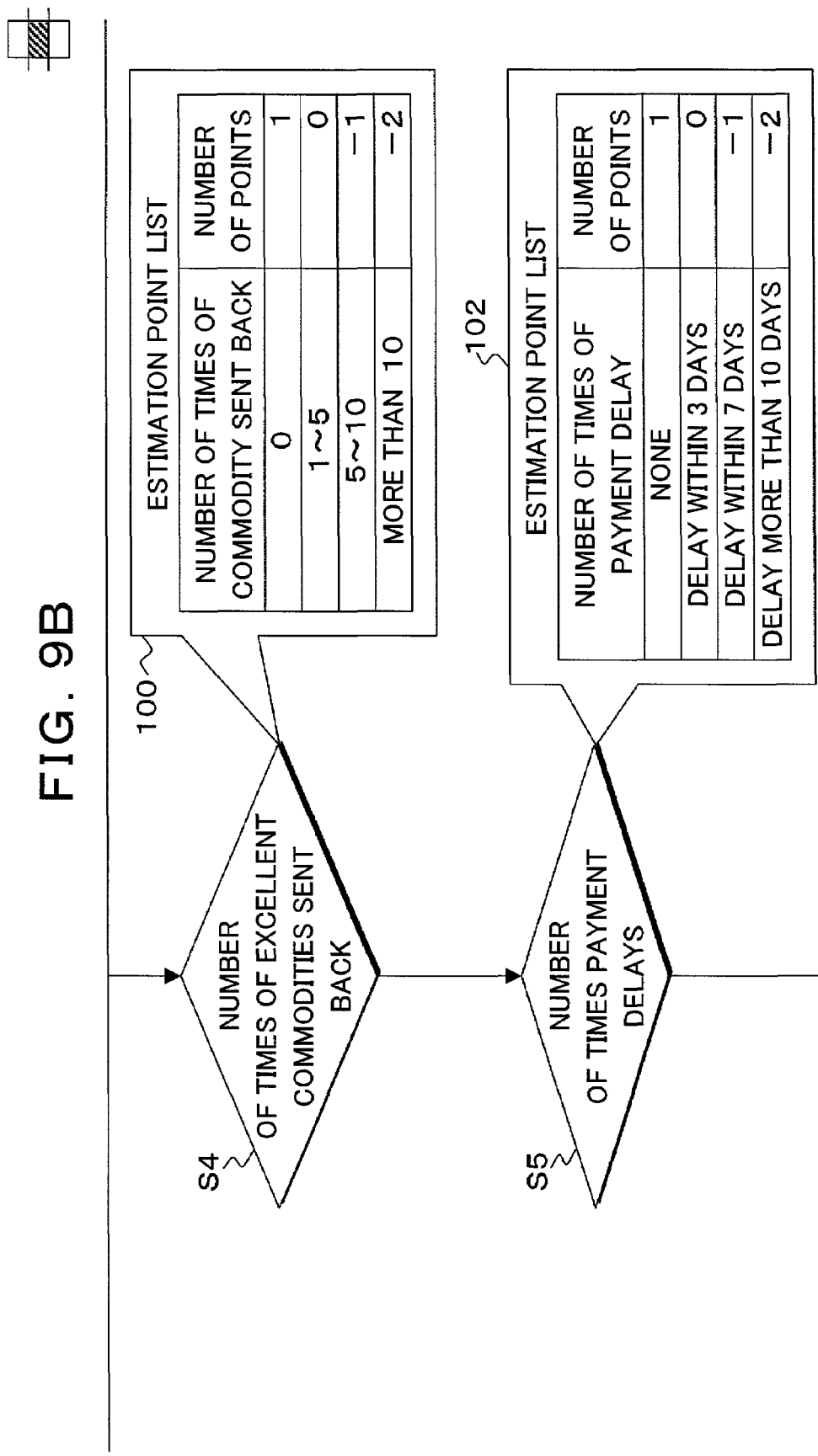

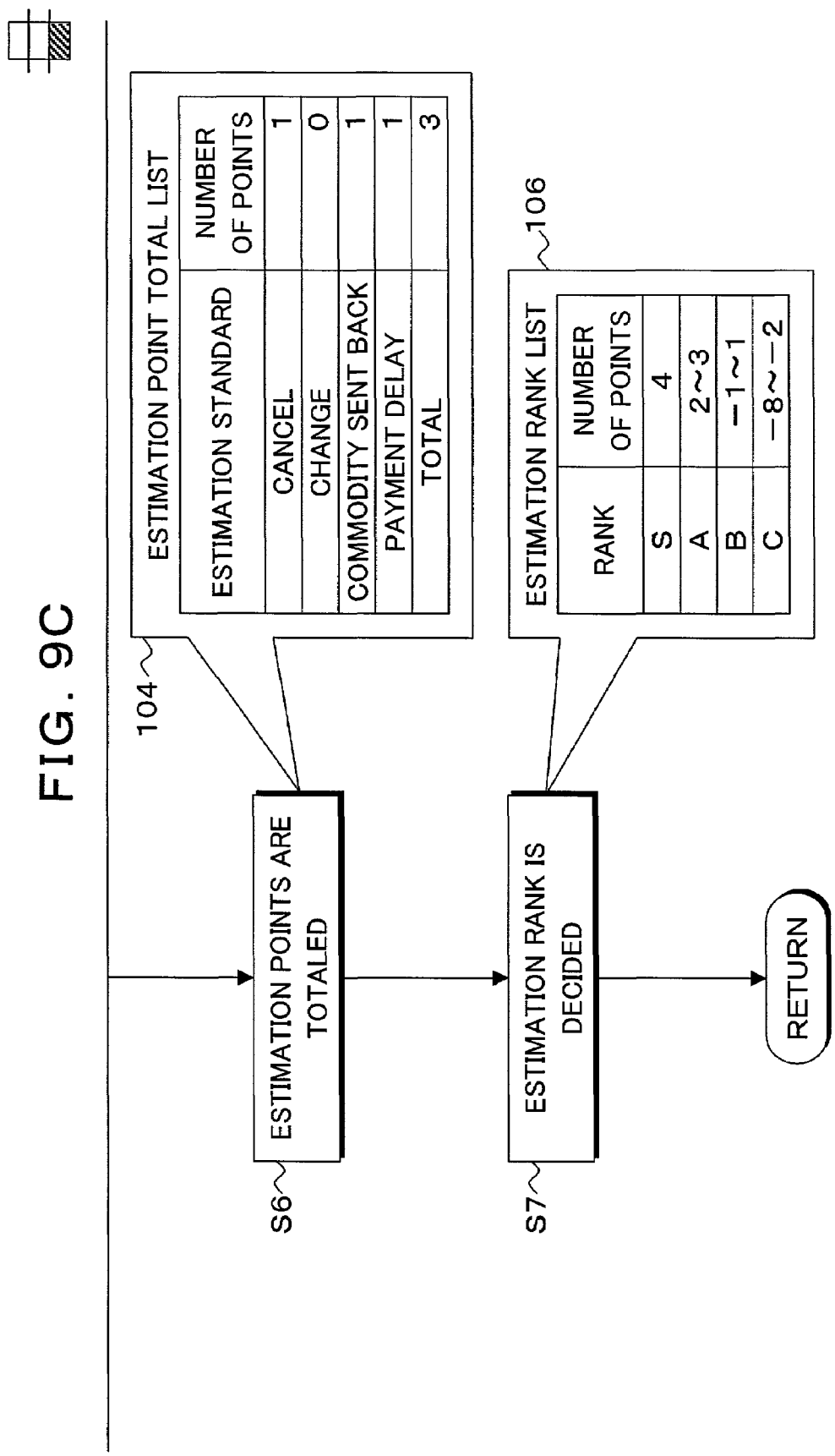

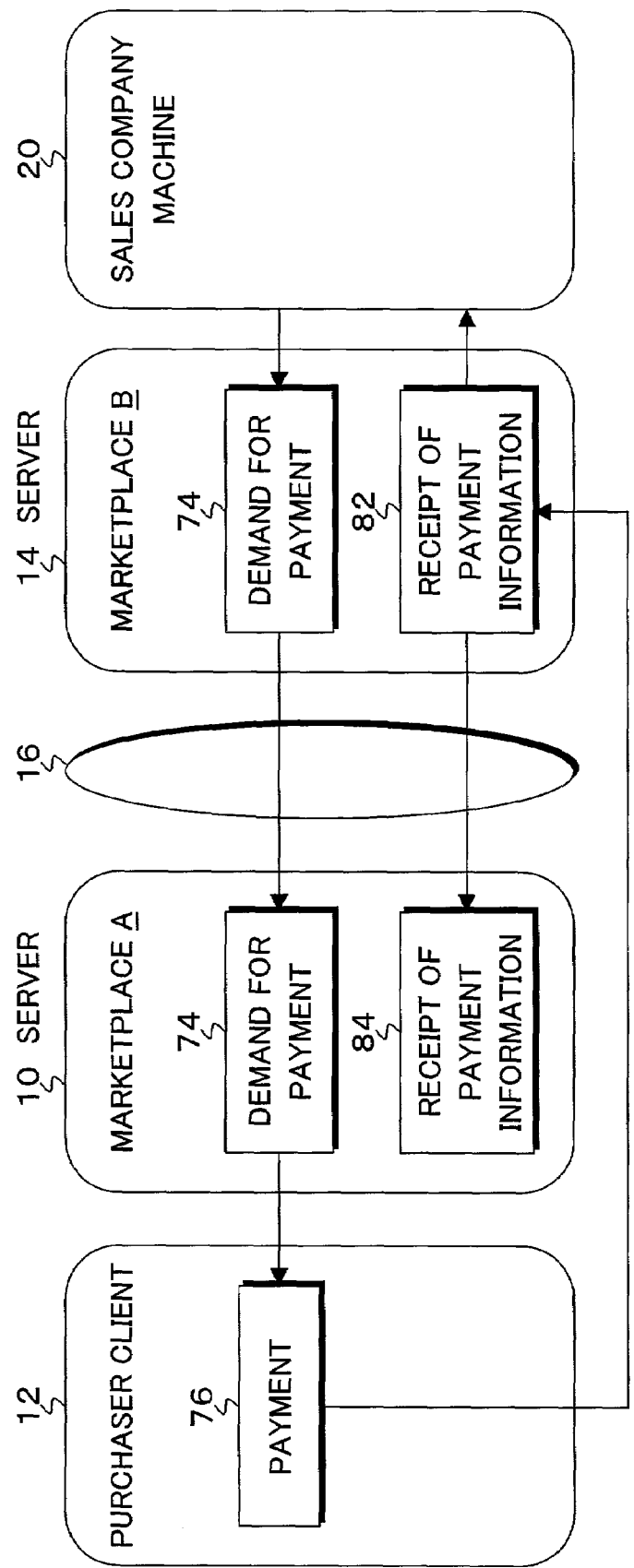

ELECTRONIC COMMERCE TRANSACTION METHOD, PROGRAM, RECORDING MEDIUM AND SERVER

BACKGROUND OF THE INVENTION

1. Field of the Invention

The present invention relates to an electronic commerce transaction method, a program, a recording medium and a server of making a commodity purchase by a purchaser of a corporation or an individual who is registered as a member in a marketplace and, in more particular, to the electronic commerce transaction method, a program, a recording medium and a server which permit a commodity purchase from other marketplace where no membership is registered when no commodity was found in the marketplace where the membership was registered.

2. Description of the Related Arts

At the present, the marketplace for the purchase of the commodity of the electronic commerce transaction which is executed on the Internet conducts a credit enquiry or a credit lending enquiry on the corporation or the individual who is about to become the user and allows him to utilize the marketplace after the registration was made as a member in order to avoid a risk of nonpayment or the like. The utilization of the marketplace is made in such a manner that the user has an access to the marketplace on the server where he is registered as a member by using a terminal unit and inputs an ID and a password which was issued at the time when the membership was registered so as to obtain a member certificate and participate in the marketplace. The purchase of the commodity is made in such a manner that a commodity retrieval page of the marketplace is opened and a category of the desired purchase commodity, a name of commodity, a name of manufacturer and the like are inputted so as to request for the retrieval of the commodity and, based on this retrieval result, the desired purchase commodity and the required number of quantities are decided so as to request for a cost estimation and, if the cost estimation reply matches a purchase condition, an order is placed and the commodity is received.

However, in a conventional electronic commerce transaction which is executed by participating in the marketplace, when the desired purchase commodity is not handled in the marketplace where the membership is registered, it is necessary to check other marketplace where the corresponding commodity seems to be handled and go through all over again the step of registering the membership for that marketplace to participate there, thereby creating a problem of taking a lot of times and labors for the purchase of the commodity. Even in the case where the membership is registered in a plurality of marketplaces for utilization, when the desired purchase commodity is not found in a certain marketplace, in order to check other marketplace where the membership is registered, it is necessary to try again to log in other marketplace and even in this case, it takes a lot of times and labors.

SUMMARY OF THE INVENTION

According to the present invention, when the commodity is not found in the marketplace where the membership is registered, an electronic commerce transaction method, a program, a recording medium and a server are provided, wherein a scheme is available which is simply usable even in the marketplace where no membership is registered.

The present invention provides the electronic commerce transaction method. This electronic commerce transaction method comprises:

a request step of requesting for the commerce transaction of the commodity purchase where the purchaser of a corporation or an individual who is a contract member participates in a marketplace A; and a mediation step of requesting other marketplaces B with which an mediation contract is concluded for the commerce transaction of the commodity purchase by attaching a credit guarantee to the purchaser when the desired purchase commodity is not obtained in the marketplace A. In this way, in the present invention, when the commodity is not found in the marketplace where the membership is registered, that marketplace guarantees its own member based on the purchase history and the payment state of the user and intermediates a series of commerce transaction such as the retrieval of the commodity, the cost estimation and the order for other marketplace with which the mediation contract is previously concluded even if the purchaser is a non-registered member, thereby permitting the electronic commerce transaction with a plurality of marketplaces where no membership is registered.

Here, the mediation step conducts a credit inquiry based on the purchase history of the purchaser in his own marketplace and, when a predetermined estimation standard is satisfied, the commerce transaction of the commodity purchase together with the credit guarantee information is requested from the other marketplace. The mediation step conducts an estimation based on a plurality of items including, for example, the number of times of order cancels, the number of times of order content changes, the number of times of excellent commodities sent back and the number of times of payment delays of the purchaser in his own marketplace, and decides the presence or non-presence of the credit guarantee. The mediation step establishes an estimation standard in each estimation item of the purchaser as a credit estimation by way of points, and adds a plus point when the estimation standard was satisfied, and adds a minus point when the estimation standard was not satisfied, and decides the presence or non-presence of the credit guarantee based on a total points of each item. When the commerce transaction was requested to other marketplace, the mediation step shows the purchaser the transaction information including the estimation of the purchase commodity and the reply thereto and the order and the shipment made between the purchaser and other marketplace as the commerce transaction of his own marketplace. In this way, the purchaser can utilize the commerce transaction with other marketplace without being conscious of it. When the commerce transaction requested to other marketplace was materialized and completed, the mediation step makes a demand for payment to the purchaser with his own marketplace as a drawee and, for other marketplace where the commerce transaction was materialized, a cost in which an mediation charge is deducted from the purchase cost is settled each predetermined period of time unit. When the commerce transaction requested to other marketplace was materialized and completed, the mediation step makes a demand for payment to the purchaser with other marketplace as a drawee, and may make a demand for payment to other marketplace for the mediation charge. When the purchaser of the commerce transaction mediated with other marketplace committed an unlawful transaction, the mediation step discloses the information of the purchaser to other marketplace.

The present invention provides a program of the electronic commerce transaction. This program allows a computer of the marketplace which conducts the electronic commerce transaction to execute:

a request receiving step of receiving the commerce transaction of the commodity purchase which the purchaser of the corporation or the individual who is the contract member requested by participating in the marketplace; and a mediation of requesting other marketplace with which the mediation contract is concluded for the commerce transaction of the above described commodity purchase by attaching a credit guarantee to the above described purchaser when the desired purchase commodity is not obtained in his own marketplace.

The present invention provides a computer readable recording medium that stores the program of the electronic commerce transaction. This recording medium allows the computer of the marketplace which conducts the electronic commerce transaction to execute:

a request receiving step of receiving the commerce transaction of the purchase commodity which the purchaser of the corporation or the individual who is the contract member requested by participating in the marketplace A;

a mediation step of requesting other marketplace B with which the mediation contract is concluded for the commerce transaction of the above described commodity purchase by attaching the credit guarantee to the above described purchaser when the desired purchase commodity is not obtained in his won marketplace A.

Furthermore, the present invention provides a server for the electronic commerce transaction. This server comprises:

a request receiving unit which receives the commerce transaction of the commodity purchase which the purchaser of the corporation or the individual who is the contract member requested by participating in the marketplace A, and an mediation processing unit which requests other marketplace B with which the mediation contract is concluded for the commerce transaction of the above described commodity purchase by attaching the credit guarantee to the purchaser. Incidentally, the details of the program, the recording medium and the server are the same as those in the case of the electronic transaction method.

The above and other objects, features, and advantages of the present invention will become more apparent from the following detailed description with reference to the drawings.

BRIEF DESCRIPTION OF THE DRAWINGS

FIGS. 3A, 3B, and 3C are explanatory drawings of processing procedures of the electronic commerce transaction of the present invention, which request other marketplace to mediate;

FIG. 4 is an explanatory drawing of a commodity retrieval/commodity cost estimation request screen used in the present invention;

FIGS. 5A, 5B, and 5C are explanatory drawings of a cost estimation request data under guarantee to request other marketplace to mediate;

FIGS. 6A, 6B are explanatory drawings of a commodity purchase/cost estimation request screen used in the present invention.

FIG. 9 is a flowchart showing the details of an estimation formation in the program of FIG. 8;

FIG. 10 is an explanatory drawing of other demand for payment settlement processing of the purchaser in the program of FIG. 8.

DETAILED DESCRIPTION OF THE PREFERRED EMBODIMENT

Figure 1A:
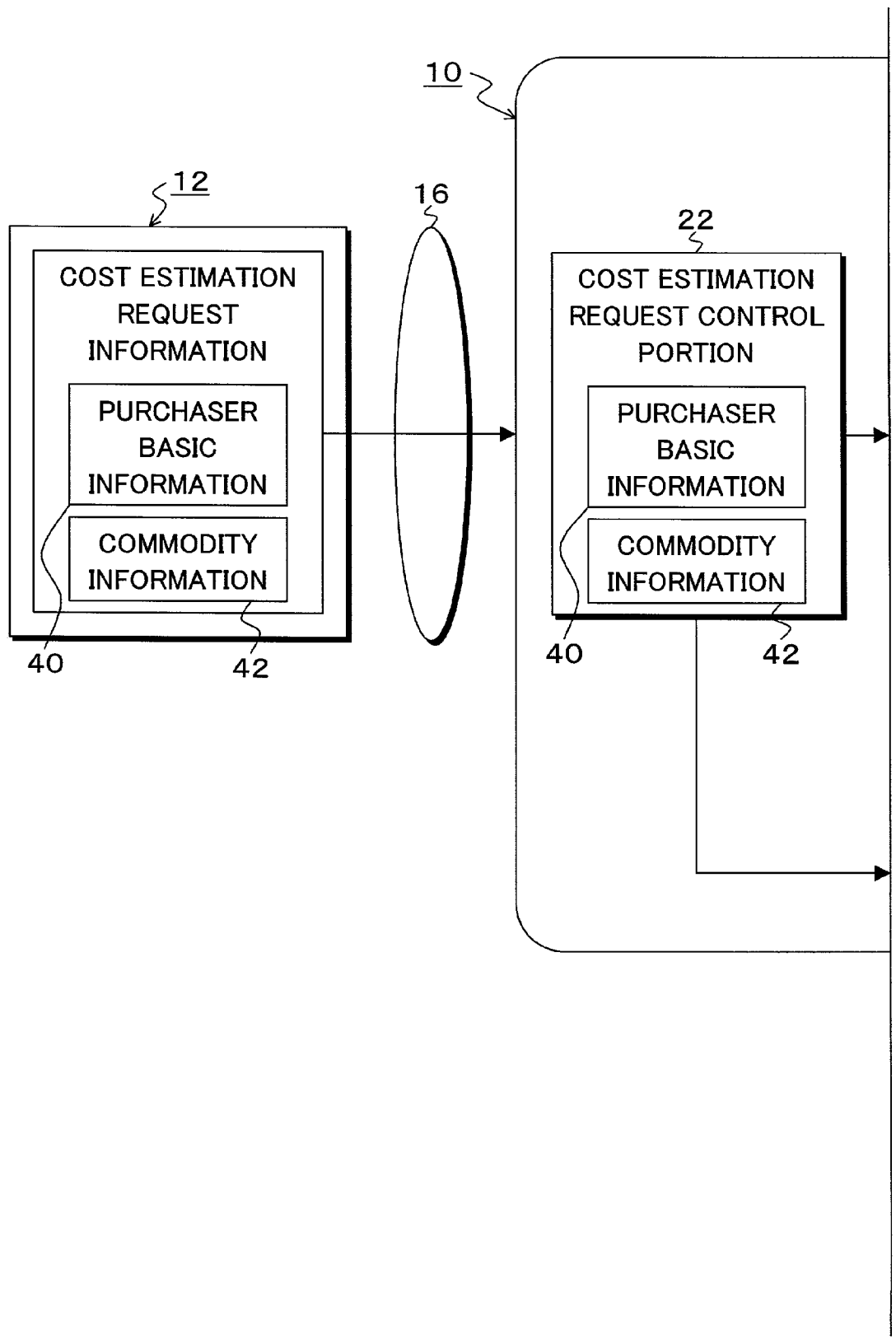
FIGS. 1A, 1B, and 1C are explanatory drawings of an electronic commerce transaction with the marketplace adopted by the present invention as an object.
Figure 1B:
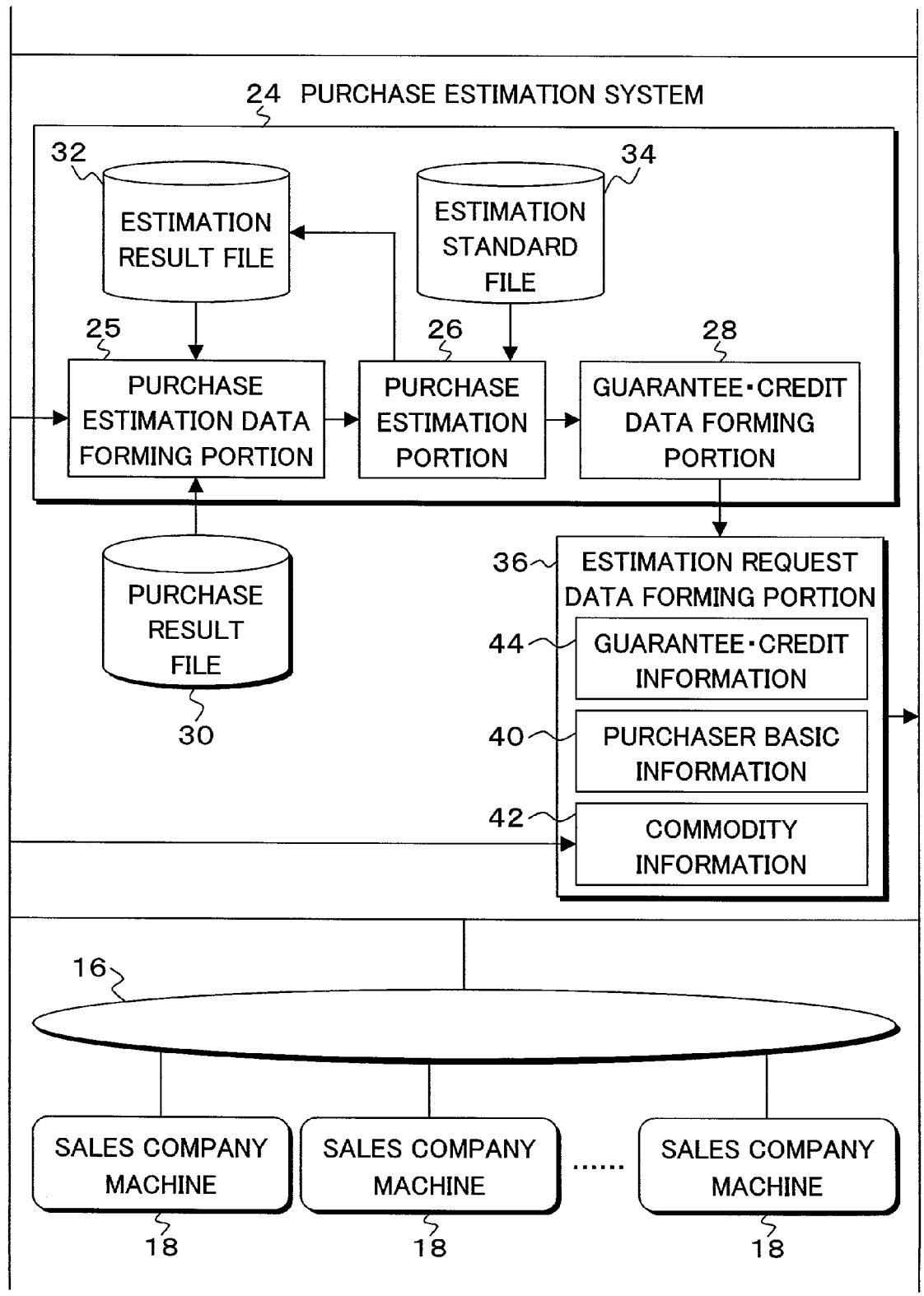
Figure 1C:
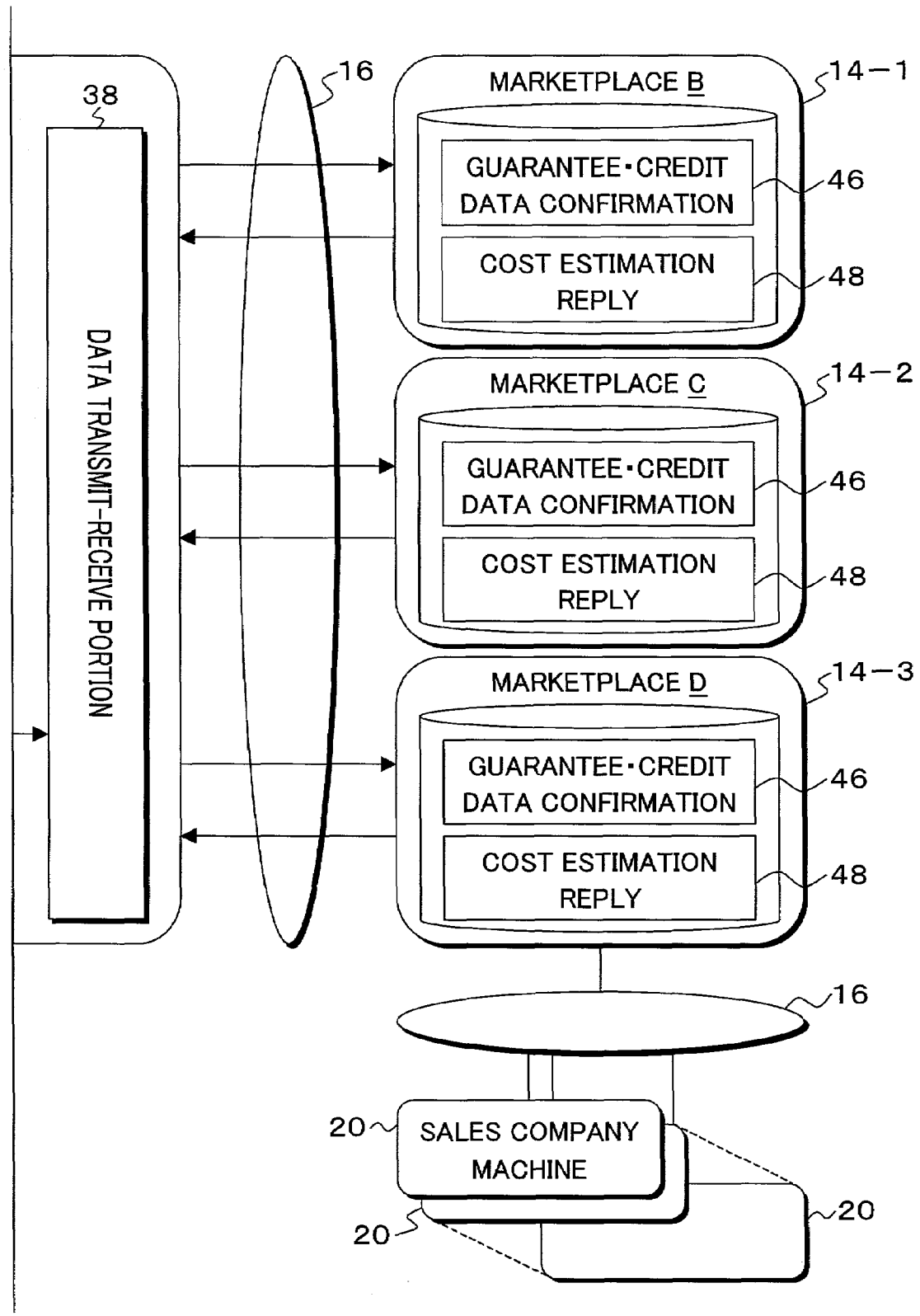

FIGS. 1A, 1B are explanatory drawings of an electronic commerce transaction with the marketplace to which the present invention as an object is adopted. The electronic commerce transaction system of the present invention is constituted by a server A which constructs a marketplace A to conduct the electronic commerce transaction and a purchaser client 12 of a corporation or an individual who is registered as a member to participate in the marketplace A which is constructed by a server 10 and conducts the electronic commerce transaction. The server 10 is connected to a sales company machine 18 provided in the sales company who participates in the marketplace A and actually receives an order from the purchaser client side 12 via a network 16. In this way, an independent electronic commerce transaction system of the marketplace A is constructed by the server 10, the purchaser client 12 and the sales company machine 18. Furthermore, in the present invention, the servers 14 of other marketplaces B, C, D are connected to the marketplace A constructed in the server 10 via the network 16. The purchaser client 12 who is registered as a member in the marketplace A of the server 10 is not registered as the member for the marketplaces B to D of the server 14 side. The servers 14 of external marketplaces are also similarly connected to the sales company machines 20 which actually processes an order in each marketplace. In the electronic commerce transaction system of the present invention, in the case where the client 12 who is the purchaser participates in the marketplace A of the server 10 by the membership registration and purchases the commodity, when the desired commodity was not found, or when the commodity meeting the desired purchase condition was not found, a "guarantee/credit" is given in the server 10 based on the history of the purchase result and the payment state of the purchaser, and the electronic commerce transaction such as the retrieval, the cost estimation, the order and the like for the purchaser who has the member contract of his own marketplace A is intermediated for the server 14 of other marketplaces B to D even if the purchaser is a member of non-registration there. For this reason, the purchaser who concludes the member contract with the marketplace A constructed in the server 10 can make the commerce transaction with other marketplaces B to D via the marketplace A of the server 10 even if he is not registered as the member with other marketplaces B to D. In this way, in order to permit the commerce transaction with other marketplaces B to D with which no member contract is concluded via the marketplace A of the server 10 with which the member contract is concluded, the contract relations among the marketplaces as shown in FIG. 2 are established in advance in the electronic commerce transaction system of the present invention.

Figure 2:
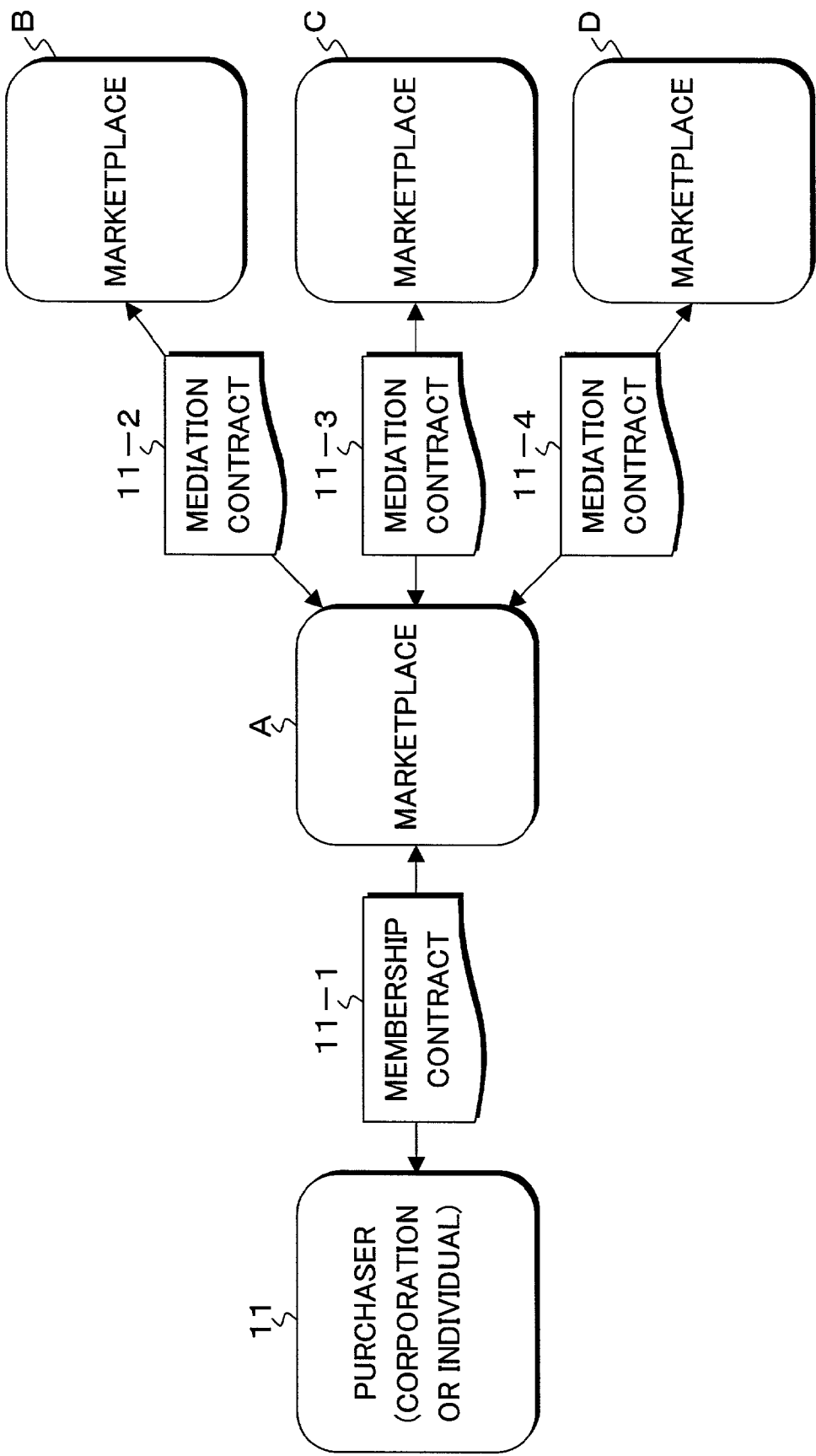
FIG. 2 is an explanatory drawing of contract relations among marketplaces, which is a prerequisite of the electronic commerce transaction of the present invention.

In FIG. 2, with respect to the marketplace A and a purchaser 11 of the corporation or the individual who concludes a member contract 11-1 with the marketplace A, in order to permit the purchaser 11 to conduct a transaction with other marketplaces B, C, D with which he does not conclude a member contract, mediation contracts 11-2, 11-3, 11-4 for mutual sharing of the marketplaces between the marketplace A and the marketplaces B, C, D, respectively through mediation of commerce transactions of respective members are concluded. In this way, a relationship is established, wherein commerce transactions of respective members with other marketplaces between the marketplace A and other marketplaces B, C, D, respectively are made possible. Here, when the marketplace A and the purchaser 11 are about to make a member contract 11-1, with respect to the application of the membership registration from the purchaser 11, the marketplace A side entrusts an external professional organization with a credit lending by a credit enquiry about the member applicant, and the member contract 11-1 is concluded with the member applicant who is given the credit lending and he is enabled to participate in the marketplace A as a member. Due to existence of the mediation contracts 11-2, 11-3, 11-4 among the marketplaces, the purchaser 11 can make the transaction with the marketplaces B, C, D under the mediation contract via the marketplace A only by concluding the member contract 11-1 with the marketplace A. Accordingly, the marketplaces B, C, D are not in need of credit lending by the credit inquiry which was necessary for the member contract 11-1 and entrusted with the external professional organization. If the desired commodity is not found in the marketplace A or the desired purchase condition is not met, the purchaser 11 can find the desired commodity or obtain the desired purchase condition actually from the marketplace A under the mediation requested to other marketplaces B, C, D without specifically being conscious of other marketplaces B, C, D.

In order to permit such a mediation transaction among the marketplaces, the server 10 of FIGS. 1A, 1B is given the functions of a cost estimation request control unit 22, a purchase estimation system 24, a cost estimation request data forming unit 36 and a data transmit-receive unit 38. Here, the estimation request control unit 22 functions as a request receiving unit and, moreover, the purchase estimation system 24, the cost estimation request data forming unit 36 and the data transmit-receive unit 38 function as a mediation processing unit. As a cost estimation request information for the cost estimation request control unit 22, the purchase client 12 side is provided with a purchaser basic information 40 and a commodity information 42. The purchaser client 12 prepares this estimation request information at the time when the cost estimation is requested, and sends the cost estimation request information to the server 10 via the network 16, and allows the cost estimation request control unit 22 to file the purchaser basic information 40 and the commodity information 42. When the cost estimation request information from the purchaser client 12 is received at this cost estimation request control unit 22, first of all, the commodity retrieval and the cost estimation processing are performed with the sales company machine 18 as an object, which is connected the marketplace of the purchaser client 12 via the network 16. When the commodity desired by the purchaser was not found by the commodity retrieval and the cost estimation processing, the mediation processing for the server 14 side of other marketplace is activated. The mediation processing first prepares guarantee/credit information regarding the purchaser at the purchase estimation system 24. The purchase estimation system 24 is provided with a purchase estimation data forming unit 25, a purchase estimation unit 26 and a guarantee/credit data forming unit 28. As a data file necessary for the purchase estimation, an external purchase result file 30 is connected to the purchase estimation system 24. Internally, an estimation result file 32 and an estimation standard file 34 are used. The purchase estimation system 24 of the present invention forms purchase estimation data such as, for example, the number of times of order cancels, the number of times of order content changes, the number of times of excellent commodities sent back, the number of times of payment delays and the like as a purchase result, and provides an estimation point as the estimation standard of each estimation item, and decides an estimation ranking by the number of points added with the estimation points for all the estimation items, and forms the guarantee/credit data. For example, the purchase estimation data forming unit 25 forms the number of times of order cancels from the purchase result file 30 as the purchase estimation data, and the number of points which changes from a plus to a minus according to the increase of the number of times of cancels read from the estimation standard file 34 by the purchase estimation unit 26 is obtained. Such a formation of the purchase estimation data and a formation of the estimation point according to the estimation standard are also applied to the number of times of order content changes, the number of times of excellent commodities sent back, the number of times of payment delays and the like in addition to the above described, and the total number of points of each estimation item is obtained. Higher the number of points is at the plus side, higher the estimation rank is made, and if the number of points increases at the minus side, the estimation ranking is made lower. In this way, a guarantee/credit information 44 is formed by the credit data forming unit 28. The cost estimation request data forming unit 36 attaches the guarantee/credit information 44 formed in the purchase estimation system 24 to the purchaser basic information 40 and the commodity information 42 from the purchaser client 12 which is received by the cost estimation request control unit 22, and sends them to the server 14 of other marketplace via the data transmit-receive unit 38 and requests that they are processed. In this case, when the servers 14 of other marketplaces B to D are available in plurality as shown in the drawing, since the marketplace A of the server 10 recognizes categories and specific favorite commodities of each and every marketplace, the marketplace A transmits the cost estimation request data under guarantee from the cost estimation request data forming unit 36 to the server 14 of the marketplace which seems to be most suitable.

Figure 3B:
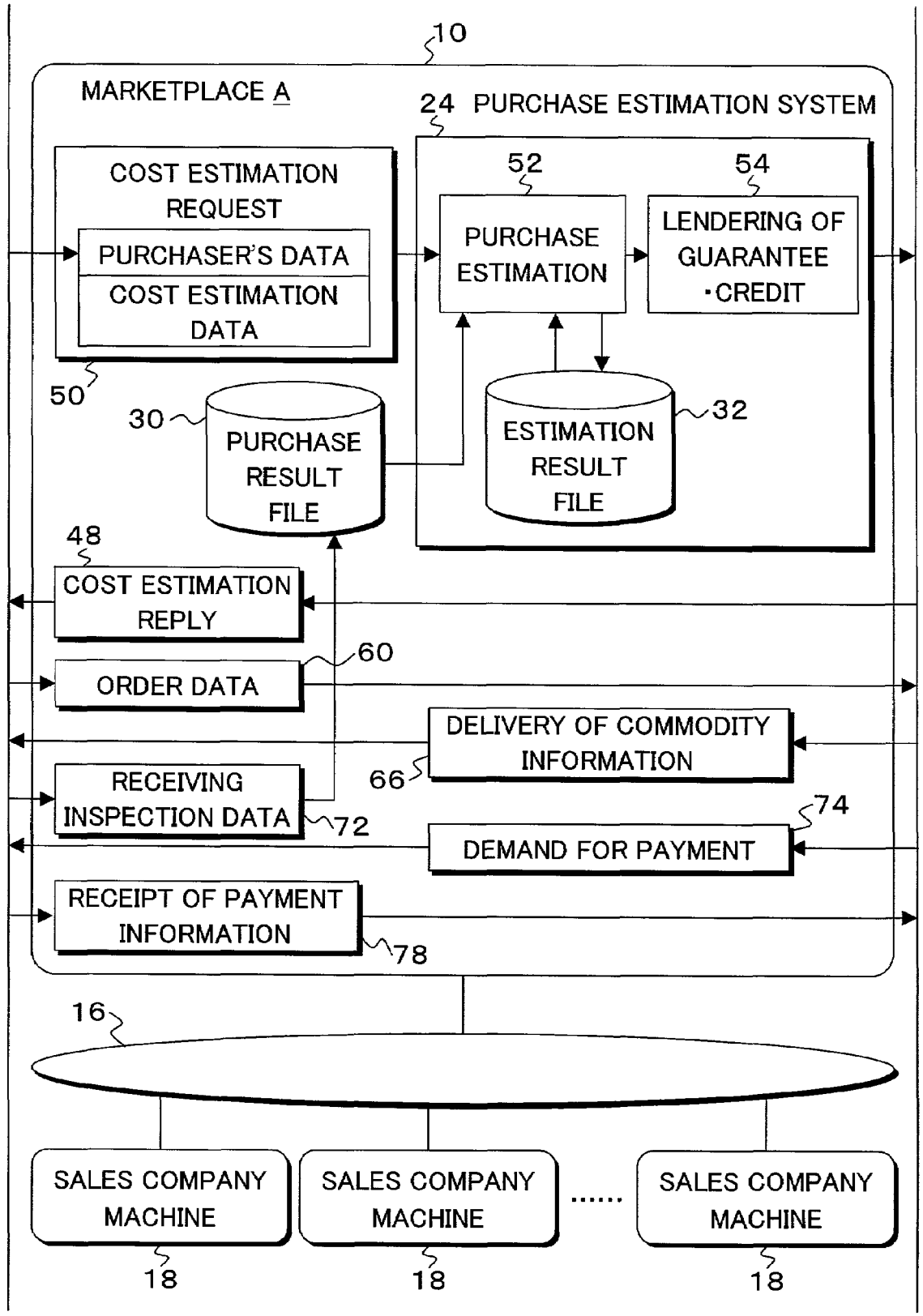
Figure 3C:
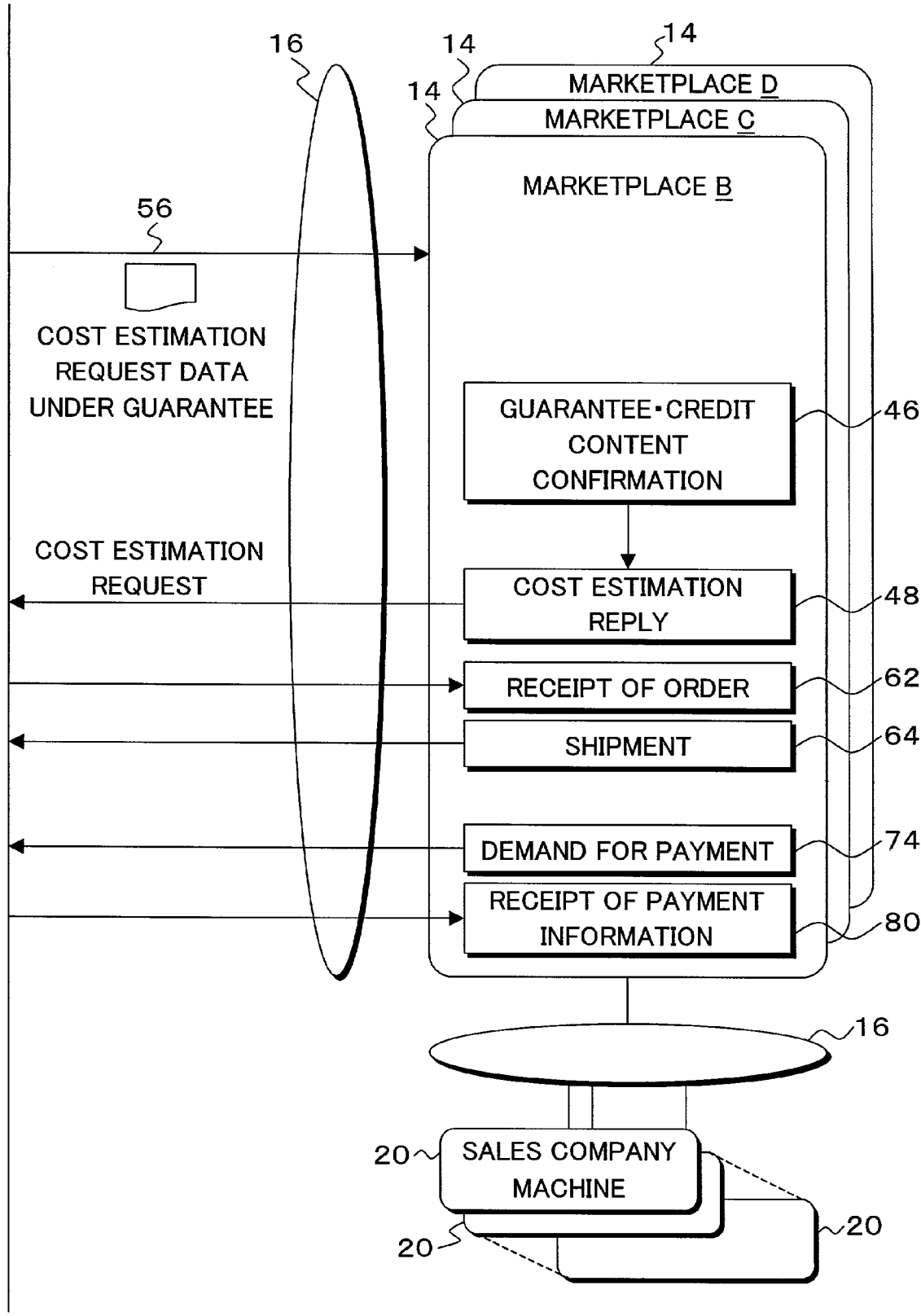

FIGS. 3A, 3B show a series of procedures from the cost estimation request of the commodity through ordering to the payment finally for the shipment of the commodity in a time series in the electronic commerce transaction for the marketplaces of FIGS. 1A, 1B. The purchaser client 12 who becomes an individual or a corporation who is registered as the member in the marketplace A of the server 10 participates in the marketplace A and makes a cost estimation request by having access to the server 10 by using a personal computer 12-1 and the like.

FIG. 4 is an explanatory drawing of a commodity retrieval/commodity cost estimation request screen 108 to be used for the cost estimation request from the purchaser client 12. The commodity retrieval/commodity cost estimation request screen is provided with a commodity retrieval unit 110 in the middle of the screen, to which the purchaser inputs a category, a name of commodity, a name of sales company, a name of manufacturer and a product number. In this example, "MO disc" is inputted to the category. By using such a commodity retrieval/commodity cost estimation request screen 108, a cost estimation request 50 is made from the purchaser client 12 to the server 10. The cost estimation request 50 makes the commodity retrieval/cost estimation inside the marketplace A where the purchaser data and the cost estimation data are constructed in the server 10, but when the desired commodity is not found there, the purchaser estimation system 24 is activated. The purchaser estimation system 24 makes a purchaser estimation 52 by using the purchase result file 30 and the estimation result file 32, and performs a guarantee/credit lending 54 based on the purchaser estimation 52, and sends a cost estimation request data under guarantee 56 to, for example, other marketplace B which is constructed in the server 14. The server 14 of the marketplace B which received the cost estimation request data under guarantee 56 makes a guarantee/credit content confirmation 46 and, after that, performs the commodity retrieval and the cost estimation on the sales company connected to itself and transmits a cost estimation reply 48 to the server 10. This cost estimation reply 48 is transmitted to the purchaser client 12 via the server 10. Since this cost estimation reply 48 is sent to the purchaser client 12 by being collected as the information of the marketplace A of the server 10, the purchaser client 12 side does not become conscious of the cost estimation reply prepared by other marketplace B which is constructed in the server 14. Specifically, similarly to the commodity retrieval/commodity cost estimation request screen 108 of FIG. 4, a retrieval result retrieved in the marketplace of the server 14 by receiving the mediation request from the server 10 is displayed as a retrieval result 112 under the lower side of the commodity retrieval unit 110. Here, though the retrieval result 112 enumerates the retrieval result of the commodity corresponding to the category "MO disc" which was requested to the commodity retrieval unit, if the desired commodity is not found there, a list of similar commodities is displayed. As for the similar commodities, for example, when the category of the commodity retrieval designates 640MB as a capacity such as "MO disc 640MB", MO discs of 230MB and 540MB are, for example, displayed as the retrieval result of the similar commodities. Although the retrieval result 112 of FIG. 4 displays a list of commodities, at the same time, the cost information can be seen and a specific cost estimation can be made by click operation.

Referring again to FIGS. 3A, 3B, in the case where the cost estimation reply 48 was obtained in the purchaser client 12, when an order 58 is placed based on this reply, an order data 60 is sent via the server 10 to the server 14 of the marketplace B which made the cost estimation reply 48 and a receipt of order 62 is made. Based on the receipt of order 62, a shipment 64 is made, and based on the shipment 64, a delivery of commodities information 66 to the server 10 is sent, which becomes an advice 68 of the shipment of commodities information for the purchaser client 12. With respect to the advice of the shipment 64 for the order 58, the purchaser client 12 conducts a receiving inspection 70, and the result of the receiving inspection 70 is recorded in the purchase result file 30 of the server 10 as a receiving inspection data 72. For example, when the purchaser client 12 side places the order 58 and, after that, cancels it or when the shipment of commodities is accepted and, after that, it is sent back, the receiving inspection data 72 showing the result of each case is reflected on the purchase result file 30. When the receipt of the commodity is normally completed, a demand for payment 74 is sent to the server 10 from the server 14 which is a meidator, and is sent to the purchaser client 12 via the server 10. Upon receipt of this demand for payment 74, the purchaser client 12 executes a payment 76 according to a predetermined payment condition and, based on this payment, the server 10 receives a receipt of payment information 78. The present embodiment executes a processing, wherein the payment of the purchaser client 12 is deposited at the marketplace A of the server 10, and the amount from which a mediation charge is deducted is paid to the marketplace B of the server 14 which is the mediator, and this is informed to the server 10 as a receipt of payment information 80.

Here, while this receipt of payment information 80 by the payment 76 from the purchaser client 12 is sent in a real time, the payment to the server 14 from the server 10 takes such a payment form where the receipt of payment information is collected each period, for example, each week or each month and, from the collected receipt of payment information, the amount from which the mediation charge is deducted is paid to the marketplace of the server 14. Incidentally, the processing of the cost estimation reply 48, the receipt of order 62, the shipment 64, the demand for payment 74 and the like in the marketplace constructed in the server 14 which is the mediator actually becomes the information to be transmitted and received and processed via the server 14 for the sales company 20 who participates in the marketplace B of the server 14 via the network 16. However, in order to simplify the description here, it is shown as the processing in the marketplace constructed on the server 14.

FIGS. 5A, 5B are explanatory drawings of the data structure of the cost estimation request data under guarantee 56 to be sent to the server 14 by the mediation request from the server 10 of FIG. 3A, 3B. This cost estimation request data under guarantee 56 includes the purchaser basic information 40 and the commodity information 42, to which the guarantee/credit information 44 formed in the purchaser estimation system 24 is added. The purchaser basic information 40 is divided into a corporate basic information 40-1 and an individual basic information 40-2, either one of which is sent. The commodity information 42 includes examples of items 1 to 18, among which items 4, 8, 10 to 18 are the commodity information that is used by the purchaser in the case where he is a private person. Of course, if the purchaser is a corporation, all the items 1 to 18 can be used. The guarantee/credit information 44 added to the purchaser basic information 40 and the commodity information 42 is constituted by a guarantee information 44-1 and an external credit information 44-2. The guarantee information 44-1 is the information prepared by the purchaser estimation system 24 of FIGS. 3A, 3B. The external credit information 44-2 is the credit information obtained by requesting an external professional organization to conduct a credit enquiry at the time when the purchaser is registered as a member. In this example, the example is cited for the case where the purchaser as the external credit information 44-2 is the corporation. This cost estimation request data under guarantee 56 of FIGS. 5A, 5B sends all of the purchaser basic information 40, the commodity information 42 and the guarantee/credit information 44 to the mediator. However, when the "guarantee ranking" in the guarantee information 44-1 given by the purchaser estimation system 24 in the server 10 of the present invention is a rank S of the highest rank, the commodity information 42 and the guarantee information 44-1 only are sent as the cost estimation request data under guarantee 56 without showing the purchaser basic information 40, and the purchaser basic information 40 and the external credit information 44-2 which can specify the purchaser may be not shown. If, by any chance, there happens any trouble between the purchaser who was mediated and the mediator marketplace, the purchaser basic information 40 and the external credit information 44-2 regarding the purchaser may be disclosed.

FIGS. 6A, 6B are specific examples of the commodity purchase/cost estimation request screen 114 displayed by obtaining the cost estimation reply for the commodity retrieval and the commodity cost estimation by the commodity retrieval/commodity cost estimation request screen 108 of FIG. 4. In this commodity purchase/cost estimation request screen 114, the commodity information 116 obtained by the commodity retrieval is displayed in the upper part, under which a purchase/cost estimation request unit 118 is provided. The purchase/cost estimation request unit 118 is provided with input frames for the shipment destination metropolis and districts, processing sections as to whether it is a purchase or a cost estimation, a quantity, a time of shipment and the like and, by inputting necessary items therein, the cost estimation or the receipt of order can be made.

Figure 7:
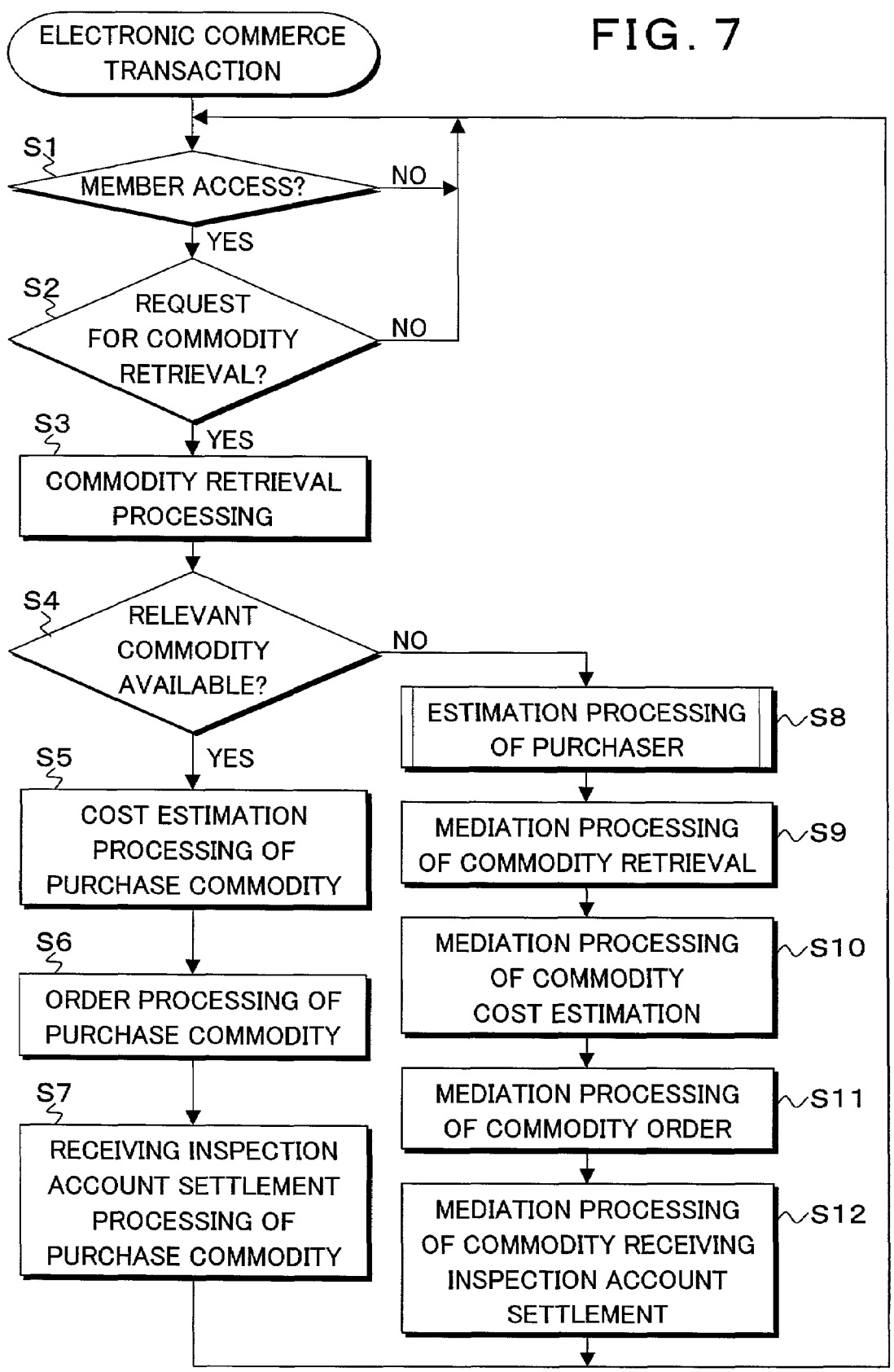
FIG. 7 is a flowchart of the program executing the electronic commerce transaction with the marketplace of the present invention as an object.

FIG. 7 is a flowchart of the electronic commerce transaction program in the present invention for the marketplace, which is executed by the server 10 of FIGS. 1A, 1B. With respect to this electronic commerce transaction program executed by the server 10, in step S1, a member access by the purchaser client 12 is checked and, when the member access using a password and an ID issued by the membership registration is discriminated, in step S2, the presence or non-presence of the commodity retrieval request is checked. When the commodity retrieval request is received, the process advances to step S3 and executes the commodity retrieval processing for the sales company 8 who participates in the marketplace constructed in the server 10. When the corresponding commodity or the similar commodity is obtained corresponding commodity is available in step 4 and advances to step S5, and performs a cost estimation processing for submitting a cost estimation reply of the purchase commodity to the cost estimation request from the purchaser client 12 and, subsequently, in step S6, receives an order by accepting an order of the purchase commodity from the purchaser client 12 and executes an order processing including a shipment. In step S7, the process executes a commerce transaction inside the marketplace constructed on the server 10 after going through a receiving inspection/account settlement process of the purchase commodity. On the other hand, in step S4, when the desired commodity or the similar commodity is not found by the commodity retrieval in the marketplace constructed in the server 10, the process advances to step S8 and prepares a guarantee/credit information by performing the estimation processing of the purchaser and, by attaching the guarantee/credit information to the cost estimation request information, in step S9, requests other marketplace on the server to conduct mediation processing of the commodity retrieval, and returns the result of the commodity retrieval to the purchaser client 12 via the server 10. Subsequently, the request for the commodity cost, estimation from the purchaser client 12 is transmitted to the server 14 and the processing of returning the cost estimation reply to the purchaser client 12 is performed in step S10. Further, in step S11, the mediation processing regarding the order of the commodity from the purchaser client 12 is performed for the server 14. Finally in step S12, the receiving inspection and the account settlement processing of the purchaser client based on is the shipment information are performed.

Figure 8A:
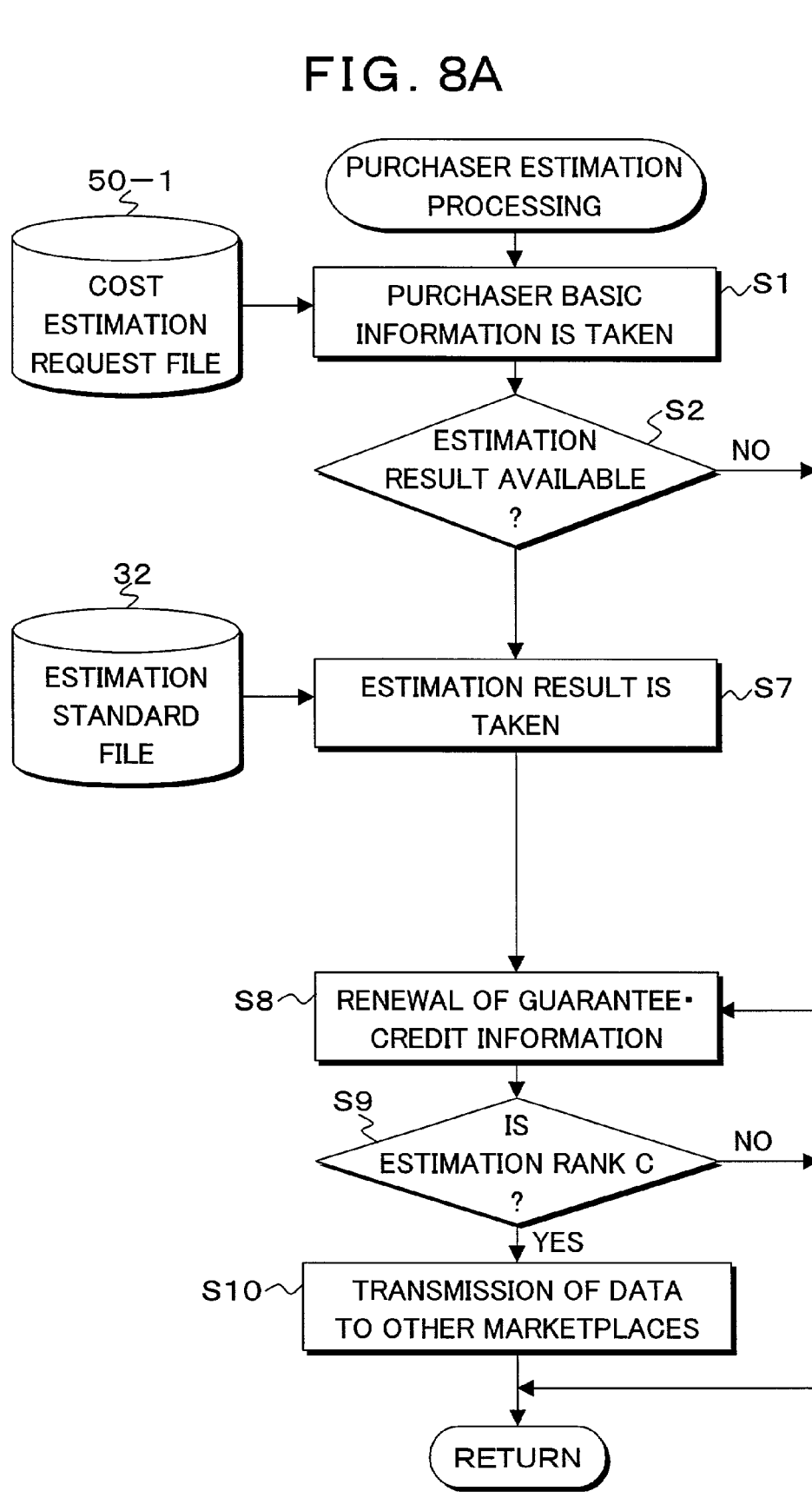
FIGS. 8A, 8B are flowcharts showing the details of a purchaser estimation process in the program of FIG. 7.
Figure 8B:
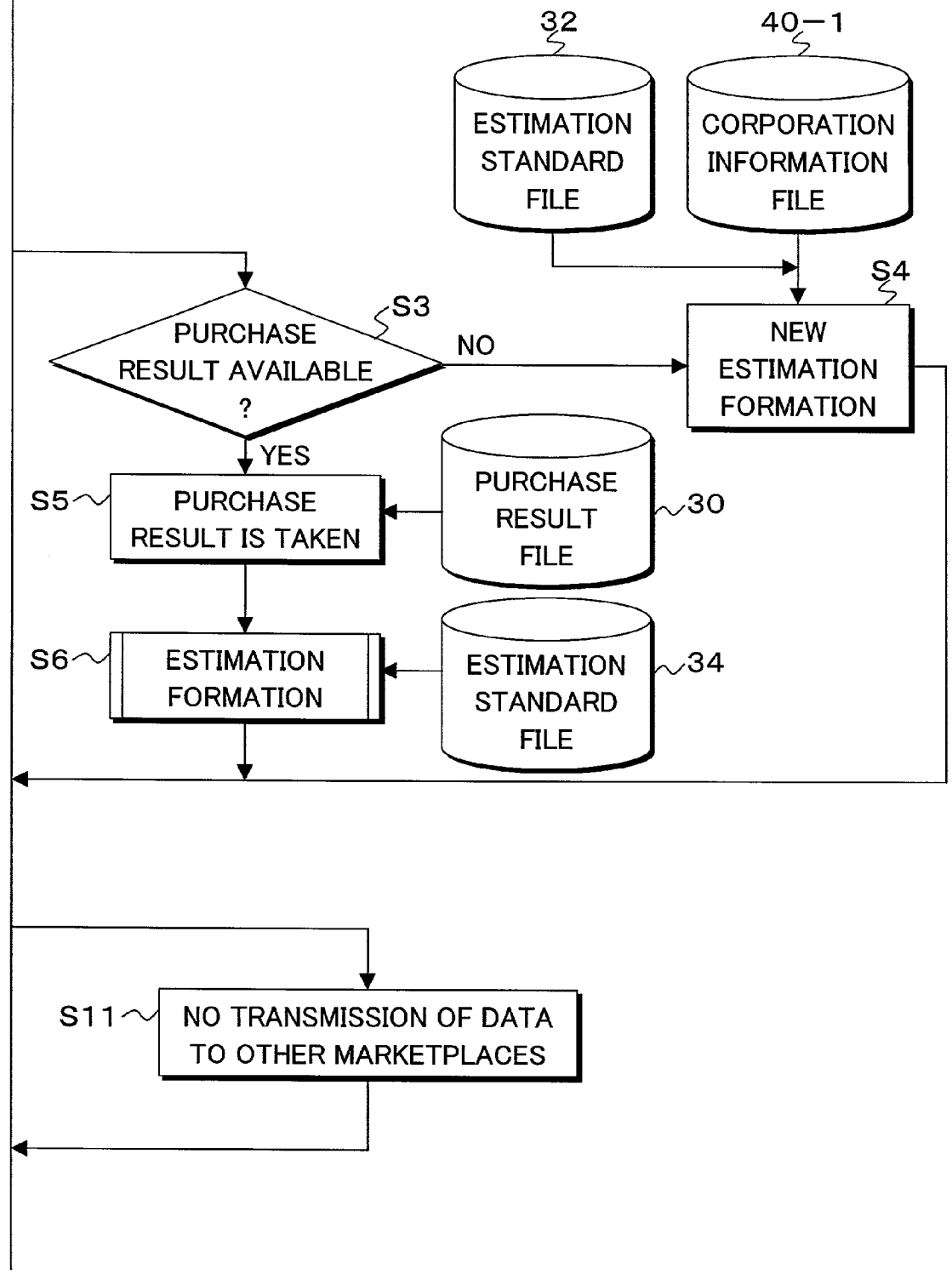

FIGS. 8A, 8B are flowcharts showing the details of the purchaser estimation in step S8 of the electronic commerce transaction in the server 10 of FIG. 7. In step S1, this purchaser estimation processing takes the purchaser basic information from within the cost estimation request file 50-1 which is received and stored from the purchaser client 12. Next, in step S2, whether an estimation result is available or not on this purchaser is checked. In step S1, the information obtained at the time when a log-in processing of step S1 of FIG. 7 was made may be utilized. When this purchaser is the first purchaser and has no estimation result in the past, the process advances to step S3 and determines whether there is any purchase result in the past. When this purchase result is the first purchase result this time, the process advances to step S4 and forms a new estimation. This new estimation forming uses the purchaser basic information file 40 and the estimation standard file 34, and the estimation ranking established at the time when the member contract was concluded in advance is used as defaulted, and the new estimation is formed. On the other hand, when there is a purchase result available in step S3, the process advances to step S5 and takes the purchase result information of the corresponding purchaser from the purchase result file 30. Subsequently, in step 6, the estimation forming processing of the purchase result and the estimation standard file is performed based on the estimation standard file 34.

The details of the estimation forming processing of the step S6 is shown in the flowchart of FIG. 9. The estimation forming processing first reads the estimation standard from the estimation standard file 34 of the step S1. The present embodiment cites four items such as the number of times of order cancels, the number of times of order content changes, the number of times of excellent commodities sent back and the number of times of payment delays as examples for the purchase estimation data items. In step S2, the estimation point by the number of times of order cancels is formed and, by using an estimation point list 96 of the number of points for the number of times of cancels as an estimation standard, the number of points corresponding to the number of times of cancels counted by the current purchase result is obtained. Next, in step S3, in the case of the number of times of order content changes, by referring to the estimation point list 98 which sets the number of points for the number of times of changes, the number of points corresponding to the current number of times of order content changes is obtained. Next, in step S4, the number of times of excellent commodities sent back is discriminated and, by referring to an estimation point list 100 showing the number of points for the number of times of the commodities sent back, the number of points for the current number of times of the excellent commodities sent back is obtained. Further, in step S5, in the case of the number of times of payment delays, by referring to an estimation point list 102 showing the number of points for the number of times of payment delays, the number of points corresponding to the current number of times of payment delays is obtained. Subsequently, in step S6, an estimation point total list 104 totaling the number of points obtained from the purchase results in relation to four estimation bases obtained in steps S2 to S6 is formed. Finally, in step S7, by referring to an estimation rank list 106, the estimation rank corresponding to the total number of points obtained from the estimation point total list 104 is decided. Regarding this estimation rank, larger the number of points is, higher the rank becomes, and smaller the number of points is, lower the rank becomes.

Referring again to FIGS. 8A, 8B, when the estimation formation is completed in step S6, the process advances to step S6 and, after the guarantee/credit information is renewed, whether it is, for example, the estimation rank C or not is checked. When the estimation rank is other than the rank C of the lowest rank, the process advances to step S10 and transmits the cost estimation request data under guarantee to other marketplace. On the contrary, when the estimation rank is the rank C of the lowest rank, the transmission of the cost estimation request data to other marketplace is not performed in step S11. Also even when there was the estimation result available in step S2, the estimation may be newly formed every time based on new purchase result, or the estimation may be newly formed at a predetermined timing. Further, when there was the estimation result previously available in step S2, the process takes the estimation result such as the estimation rank list 106 of FIG. 10 from the estimation result file 32 in step S7 and advances to step S8 and, after renewing the guarantee/credit information when the estimation rank is the other than the rank C of the lowest rank, for example, in step S9, advances to step S10 and transmits the cost estimation request data under guarantee to other marketplace. By the automatic assessment of the purchase estimation based on the purchase result in the server 10 which constructs such a marketplace, the mediation by the transmission of the cost estimation request data to the marketplace constructed on other server is performed only for the purchaser who can be guaranteed and, therefore, the trouble caused by the mediation in other marketplace where no membership is registered can be basically eliminated.

FIG. 10 shows other embodiment of an account settlement processing starting from the demand for payment to the payment in the electronic commerce transaction that performs the mediation among the marketplaces of the present invention. While, in the embodiment of FIGS. 3A, 3B, the payment 76 for the demand for payment 74 is made for the marketplace of the server 10 which is registered as the member, in the embodiment of FIG. 10, the demand for payment 74 from the server 14 of other marketplace is sent from the server 10 to the purchase client 12, and the payment 76 for this demand for payment 74 is made to the server 14 of the marketplace which is the mediator in this embodiment, and a receipt of payment information 82 is sent. For this reason, the server 14 which is a mediated marketplace sends a mediation charge to the sever 10 which is a mediating marketplace as the receipt of payment information 84 based on the receipt of payment information 82 from the purchaser client 12.

Figure 11:
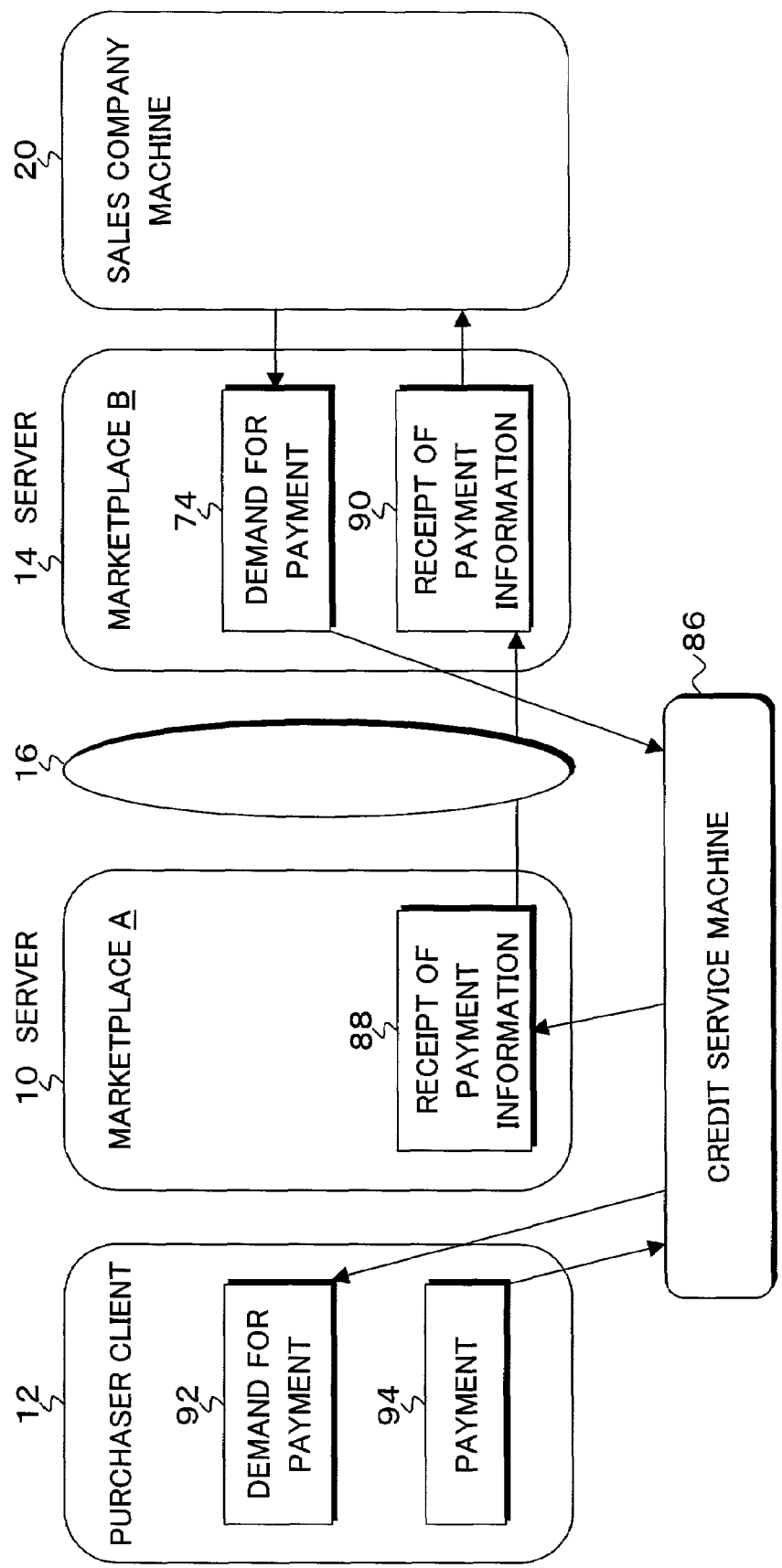
FIG. 11 is an explanatory drawing of the demand for payment processing in the electronic commerce transaction of the present invention utilizing a credit service.

FIG. 11 is an explanatory drawing for the demand of payment and the payment utilizing a credit service. This payment utilizing the credit service is mainly used in the case where the purchaser is the private person. The demand for payment 74 from the server 14 that constructs the mediated marketplace is made to the credit service machine 86, and the payment is made to the server 10 of the mediating marketplace, and the receipt of payment information 88 is given to the server 10. The server 10 who received this receipt of payment information 88 totals the payment, for example, every month and, after paying the amount from which the mediation charge was deducted to the marketplace of the server 14 side, sends the receipt of payment information 90 there. On the other hand, the credit service machine 86 makes the demand for payment 92 to the purchaser client 12, in response to which the purchaser-makes the payment 94 to a debit account B. Needless to mention, the demand for payment 92 and the payment 94 between the credit service machine 86 and the purchaser client 12 are executed in the usual form of a business transaction with bank.

Next, the embodiment of a computer readable recording medium that stores the electronic commerce transaction with the marketplace of the present invention as an object will be described. The server 10 for the marketplace shown in FIGS. 1A, 1B is a computer system and comprises CPU, RAM, ROM, a hard disc HDD, a CD-ROM drive, a FD drive, a key board, a mouse, an IO interface connecting a display, a LAN interface, a modem and the like. The electronic commerce transaction program of the present invention is stored in a portable type recording medium such as CD-ROM, a floppy disc, a DVD disc, a magneto-optical disc, an IC CARD and the like, a database using the modem and the LAN interface and connected via a phone line or the database of other computer system, and is executed after being installed in the computer which constitutes the server 10. In addition to the portable type storage medium such as CD-ROM, the magneto-optical disc, the IC card and the like, the recording medium includes a storage unit such as a HDD disc provided inside and outside the computer, the database holding the program via the phone line, or other computer system and other database and, moreover, a transmission medium on the phone line.

As described above, according to the present invention, even when the purchaser was not able to find the commodity in the marketplace where the membership is registered or the desired purchase condition was not found, by attaching the guarantee based on the history of the purchase and the payment state of the purchaser at the marketplace side, the retrieval, the cost estimation and the order of the purchaser are made to other marketplace where the purchaser is not registered as the member, so that the commodity desired by the purchaser and the desired purchase condition can be suitably accommodated. For this reason, even if the commodity is not handled in one marketplace, the transaction of the purchase commodity can be realized by a simple scheme where the purchaser is not imposed with a burden such as a contract with a new marketplace due to partnership with other marketplace, while the marketplace can enhance the quality of the transaction service for its own member so that the gathering of the users can be realized.

For other marketplace that receives the mediation of the transaction from the purchaser, spot transactions are generated by the mediation of the transaction in addition to the purchaser who is the existing contract member, thereby making it possible to increase the number of transactions and enhance the sales result of the marketplace. Furthermore, for other marketplace that receives the mediation of the transaction, since the guarantee is provided to the purchaser who makes the mediation from the purchase result in the mediating marketplace, even the purchaser who is not registered as the member can realize the spot transactions avoiding a risk of non-payment without requiring the credit enquiry on the purchaser.

Incidentally, the present invention includes appropriate modifications that do not damage its object and advantage, nor is it limited by the numerical values shown in the above described embodiments.

What is claimed is:

1. An electronic commerce transaction method comprising:
   receiving a request at a first marketplace for a commerce transaction for the purchase of a commodity by a purchaser of a corporation or an individual who is a contract member of the first marketplace;
   electronically attaching a credit guarantee to the requesting purchaser for the commerce transaction; and
   sending a request to purchase the commodity to a second marketplace, of which the purchaser is not a contract member, the second marketplace having a mediation contract with the first marketplace, wherein the first marketplace guarantees to the second marketplace the credit of the purchaser via the attached credit guarantee, when the desired commodity is not found in the first marketplace or a desired condition for the purchase of the commodity is not met.

2. The method according to claim 1, wherein the first marketplace conducts a credit inquiry based on the purchase history of the purchaser in the first marketplace and, when a predetermined estimation standard is satisfied, the first marketplace requests to purchase the desired commodity from the second marketplace.

3. The method according to claim 2, wherein the first marketplace makes an estimation based on a plurality of items including the number of order cancellations, the number of times the order changes, the number of times excellent commodities are sent back and the number of times payment is delayed, the first marketplace then determining based on the estimation whether to grant the credit guarantee.

4. The method according to claim 3, wherein the first marketplace establishes a point-based estimation standard, calculating a number of points for each estimation item for the purchaser, adding points when the estimation standard for an estimation item is satisfied and subtracting points when the estimation standard for an estimation item is not satisfied, the first marketplace then determining whether to grant the credit guarantee based on the total number of points.

5. The method according to claim 1, wherein, when the commerce transaction was requested from the second marketplace, the purchaser can see the transaction information including the cost estimation and the reply thereto and the order and the shipment of the commodity conducted between the purchaser and the second marketplace as though the commerce transaction took place with the first marketplace, thereby allowing the purchaser to complete the commerce transaction with the second marketplace without being aware of the transaction.

6. The method according to claim 1, wherein, when the commerce transaction requested from the second marketplace was materialized and completed, the first marketplace makes a demand for payment to the purchaser with the first marketplace as a drawee, and the first marketplace settles a purchase amount from which a mediation charge is deducted from the second marketplace where the commerce transaction was materialized.

7. The method according to claim 1, wherein, when the commerce transaction requested from the second marketplace was materialized and completed, the second marketplace makes a demand for payment from the purchaser with the second marketplace as a drawee, and the first marketplace demands a mediation charge from the second marketplace where the commerce transaction was materialized.

8. The method according to claim 1, wherein, when the purchaser of the commerce transaction between the first and the second marketplace commits an unlawful transaction, the first marketplace discloses the information of the purchaser to the second marketplace.

9. The method of claim 1, wherein the purchaser sends a cost estimation request for the commodity to the first marketplace, and
 if the commodity is not found in the first marketplace, the cost estimation request is sent to the second marketplace, and
 if the commodity is found in the second marketplace, a cost estimate for the commodity is sent to the purchaser.

10. An electronic commerce system which conducts electronic commerce transactions comprising;
 a first marketplace receiving a request for a commerce transaction for the purchase of a commodity by a purchaser of a corporation or an individual who is a contract member of the first marketplace, the first marketplace guaranteeing the credit of the purchaser via a credit guarantee; and
 a second marketplace, of which the purchaser is not a contract member, having a mediation contract with the first marketplace, the first marketplace sending a request to purchase the commodity to the second marketplace, the second marketplace receiving the credit guarantee for the purchaser from the first marketplace, when the desired commodity is not found in the first marketplace or a desired condition for the purchase of the commodity is not met.

11. A computer readable recording medium storing a program allowing a computer of a first marketplace to conduct an electronic commerce transaction, the program implementing a method comprising:
 receiving a request at the first marketplace for a commerce transaction for the purchase of a commodity by a purchaser of a corporation or an individual who is a contract member of the first marketplace;
 attaching a credit guarantee to the requesting purchaser for the commerce transaction; and
 sending a request to purchase the commodity to a second marketplace, of which the purchaser is not a contract member, the second marketplace having a mediation contract with the first marketplace, wherein the first marketplace guarantees to the second marketplace the credit of the purchaser via the attached credit guarantee, when the desired commodity is not found in the first marketplace or a desired condition for the purchase of the commodity is not met.

12. A server for an electronic commerce transaction comprising:
 a request receiving unit which receives a commerce transaction for the purchase of a commodity by a purchaser of a corporation or an individual who is a contract member of a first marketplace; and
 a mediation processing unit which sends a request for a commerce transaction to a second marketplace, of which the purchaser is not a contract member, where a mediation contract is concluded between the first marketplace and the second marketplace, the mediation processing unit attaching a credit guarantee to the purchaser for the commerce transaction when the desired commodity is not found in the first marketplace or a desired condition for the purchase of the commodity is not met.

13. An apparatus comprising:
 means for receiving a request at a first marketplace for a commerce transaction for the purchase of a commodity by a purchaser of a corporation or an individual who is a contract member of the first marketplace;
 means for attaching a credit guarantee to the purchaser for the commerce transaction; and
 means for sending a request to purchase the commodity to a second marketplace, of which the purchaser is not a contract member, the second marketplace having a mediation contract with the first marketplace, wherein the first marketplace guarantees to the second marketplace the credit of the purchaser via the attached credit guarantee, when the desired commodity is not found in the first marketplace or a desired condition for the purchase of the commodity is not met.

* * * * *

UNITED STATES PATENT AND TRADEMARK OFFICE
CERTIFICATE OF CORRECTION

PATENT NO. : 7,424,453 B2  
APPLICATION NO. : 10/086697  
DATED : September 9, 2008  
INVENTOR(S) : Akitaka Shinohara et al.

It is certified that error appears in the above-identified patent and that said Letters Patent is hereby corrected as shown below:

Column 13, Line 50, change "comprising;" to --comprising:--.

Signed and Sealed this

Twenty-fifth Day of November, 2008

JON W. DUDAS  
*Director of the United States Patent and Trademark Office*